US007865162B2

(12) United States Patent
Kent et al.

(10) Patent No.: US 7,865,162 B2
(45) Date of Patent: Jan. 4, 2011

(54) METHOD AND SYSTEM FOR SINGLE WEIGHT ANTENNA SYSTEM FOR HSDPA

(75) Inventors: Mark Kent, Vista, CA (US); Vinko Erceg, Cardiff, CA (US); Uri M. Landau, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/553,585

(22) Filed: Sep. 3, 2009

(65) Prior Publication Data

US 2010/0069032 A1     Mar. 18, 2010

Related U.S. Application Data

(63) Continuation of application No. 11/172,779, filed on Jun. 30, 2005, now Pat. No. 7,586,886.

(60) Provisional application No. 60/616,686, filed on Oct. 6, 2004.

(51) Int. Cl.
     *H04B 1/06*      (2006.01)
(52) U.S. Cl. .................................... 455/276.1; 370/338
(58) Field of Classification Search ........................ None
See application file for complete search history.

(56) References Cited

U.S. PATENT DOCUMENTS

| 6,128,276 A | 10/2000 | Agee |
| 6,201,955 B1 | 3/2001 | Jasper et al. |

(Continued)

FOREIGN PATENT DOCUMENTS

EP     1447926 A     8/2004

OTHER PUBLICATIONS

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

(Continued)

*Primary Examiner*—Lester Kincaid
*Assistant Examiner*—Phuoc Doan
(74) *Attorney, Agent, or Firm*—McAndrews, Held & Malloy, Ltd.

(57) ABSTRACT

In a RF communications system, aspects for single weight antenna system for HSDPA may comprise receiving HSDPA signals via a plurality of receive antennas and individually adjusting a phase of a portion of the received HSDPA signals via a single weight. The phase adjusted portion of the received HSDPA signals may be combined with at least one of the received HSDPA signals to generate combined HSDPA signals. At least one control signal may control the adjusting of the phase of the received HSDPA signals. Discrete phases may be communicated to adjust the phase of the portion of the received HSDPA signals, where the plurality of the discrete phases may range from zero radians to substantially $2\pi$ radians. Phase shift channel estimates may be generated during the identified time to determine the discrete phase. A desired phase may be generated from the phase shift channel estimates, and the single weight may be generated from the desired phase.

23 Claims, 7 Drawing Sheets

U.S. PATENT DOCUMENTS

| | | | |
|---|---|---|---|
| 7,660,338 B2 * | 2/2010 | Smith et al. | 375/131 |
| 2003/0031234 A1 | 2/2003 | Smee et al. | |
| 2003/0148770 A1 | 8/2003 | Das et al. | |
| 2004/0110469 A1 * | 6/2004 | Judd et al. | 455/15 |
| 2005/0195889 A1 | 9/2005 | Grant et al. | |
| 2005/0243898 A1 | 11/2005 | Reznik et al. | |
| 2007/0015545 A1 | 1/2007 | Leifer et al. | |

OTHER PUBLICATIONS

Simon Haykin, McMaster University; Mathini Sellathurai, Yvo De Jong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

European Search Report for Application No. 05017397.0, Dec. 28, 2005.

* cited by examiner

METHOD AND SYSTEM FOR SINGLE WEIGHT ANTENNA SYSTEM FOR HSDPA

CROSS-REFERENCE TO RELATED APPLICATIONS/INCORPORATION BY REFERENCE

The present application is a CONTINUATION of U.S. application Ser. No. 11/172,779, filed Jun. 30, 2005 now U.S. Pat. No. 7,586,886.

Said U.S. application Ser. No. 11/172,779 makes reference to, claims priority to and claims benefit from U.S. Provisional Application No. 60/616,686, filed Oct. 6, 2004.

The above-identified applications are hereby incorporated herein by reference in their entirety.

The present application is related to the following applications, each of which is incorporated herein by reference in its entirety for all purposes:

U.S. patent application Ser. No. 11/173,870 filed Jun. 30, 2005;

U.S. patent application Ser. No. 11/174,303 filed Jun. 30, 2005;

U.S. patent application Ser. No. 11/173,502 filed Jun. 30, 2005;

U.S. patent application Ser. No. 11/173,871 filed Jun. 30, 2005;

U.S. patent application Ser. No. 11/173,964 filed Jun. 30, 2005;

U.S. patent application Ser. No. 11/173,252 filed Jun. 30, 2005;

U.S. patent application Ser. No. 11/174,252 filed Jun. 30, 2005;

U.S. patent application Ser. No. 11/172,756 filed Jun. 30, 2005;

U.S. patent application Ser. No. 11/173,305 filed Jun. 30, 2005;

U.S. patent application Ser. No. 11/172,759 filed Jun. 30, 2005;

U.S. patent application Ser. No. 11/173,689 filed Jun. 30, 2005;

U.S. patent application Ser. No. 11/173,304 filed Jun. 30, 2005;

U.S. patent application Ser. No. 11/173,129 filed Jun. 30, 2005;

U.S. patent application Ser. No. 11/172,702 filed Jun. 30, 2005;

U.S. patent application Ser. No. 11/173,727 filed Jun. 30, 2005;

U.S. patent application Ser. No. 11/173,726 filed Jun. 30, 2005;

U.S. patent application Ser. No. 11/172,781 filed Jun. 30, 2005;

U.S. patent application Ser. No. 11/174,067 filed Jun. 30, 2005;

U.S. patent application Ser. No. 11/173,854 filed Jun. 30, 2005;

U.S. patent application Ser. No. 11/173,911 filed Jun. 30, 2005; and

U.S. patent application Ser. No. 11/174,403 filed Jun. 30, 2005.

FIELD OF THE INVENTION

Certain embodiments of the invention relate to receiving radio frequency signals. More specifically, certain embodiments of the invention relate to a method and system for single weight antenna system for HSDPA.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1a is a technology timeline indicating evolution of existing WCDMA specification to provide increased downlink throughput. Referring to FIG. 1a, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbils to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath signal. A RAKE receiver operates on multiple discrete paths. The received multipath signals can be combined in several ways, from which maximal ratio combining (MRC) is preferred in a coherent receiver. However, a RAKE receiver may be suboptimal in many practical systems, for example, its performance may degrade from multiple access interference (MAI), that is, interference induced by other users in the network.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. Each RF chain generally comprises a low noise amplifier (LNA), a filter, a downconverter, and an analog-to-digital converter (ADC). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for single weight antenna system for HSDPA, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single weight antenna system for HSDPA. Aspects of method and system may comprise receiving HSDPA signals via a plurality of receive antennas and individually adjusting a phase of a portion of the received HSDPA signals via a single weight. The phase adjusted portion of the received HSDPA signals may be combined with at least one of the received HSDPA signals to generate combined signals. At least one control signal may control the adjusting of the phase of the portion of the received HSDPA signals.

The single weight that may be used to adjust the phase of a portion of the received HSDPA signals may be determined at an identified time. A plurality of the discrete phases may be communicated to a phase shift adjuster and utilized to adjust the phase of the portion of the received HSDPA signals. The plurality of discrete phases may within a range from zero radians to substantially $2\pi$ radians. Phase shift channel estimates may be generated during the identified time to determine the discrete phase. A desired phase may be generated from the phase shift channel estimates, and the single weight may be generated from the desired phase.

Figure 1A:
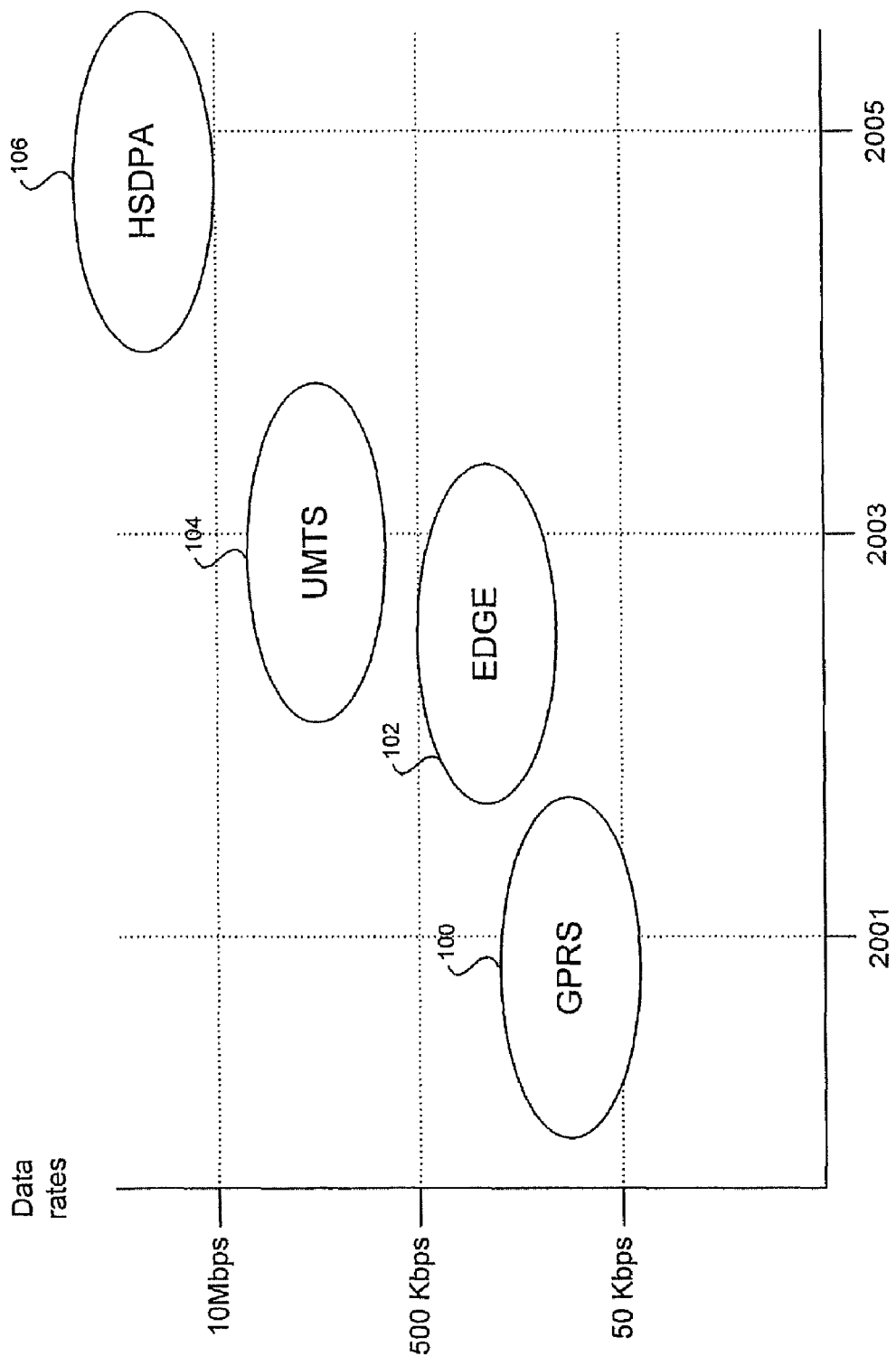
FIG. 1a is a technology timeline indicating evolution of existing WCDMA specification to provide increased downlink throughput.
Figure 1B:
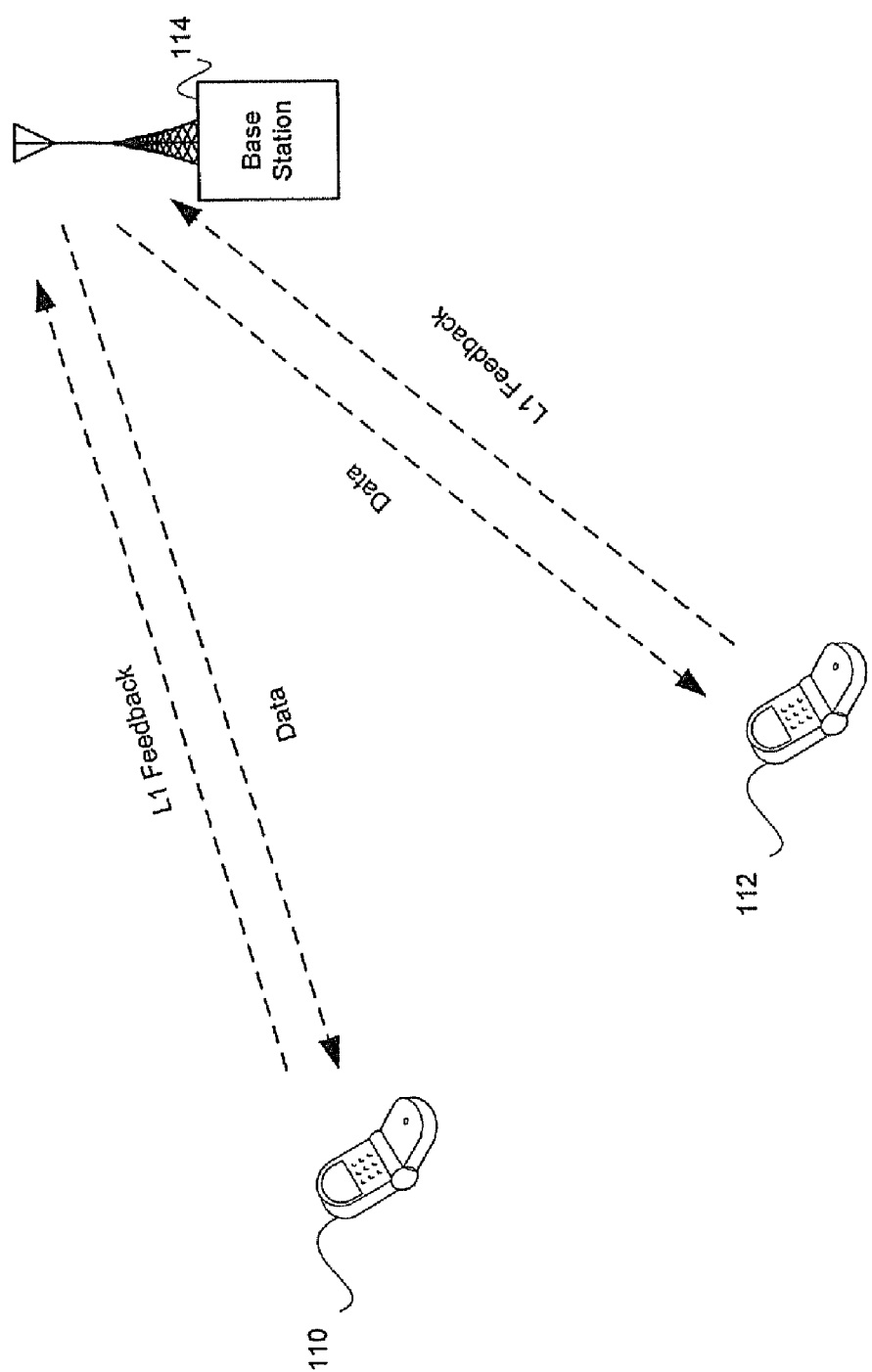
FIG. 1b illustrates an exemplary High Speed Downlink Packet Access (HSDPA) distributed architecture that achieves low delay link adaptation, in connection with an embodiment of the invention.

FIG. 1b illustrates an exemplary HSDPA distributed architecture that achieves low delay link adaptation, in connection with an embodiment of the invention. Referring to FIG. 1b, there is shown terminals 110 and 112 and a base station (BS) 114. HSDPA is built on a distributed architecture that achieves low delay link adaptation by placing key processing at the BS 114 and thus closer to the air interface as illustrated. HSDPA leverages methods that are well established within existing GSM/EDGE standards, including fast physical layer (L1) retransmission combining and link adaptation techniques, to deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control cannot reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
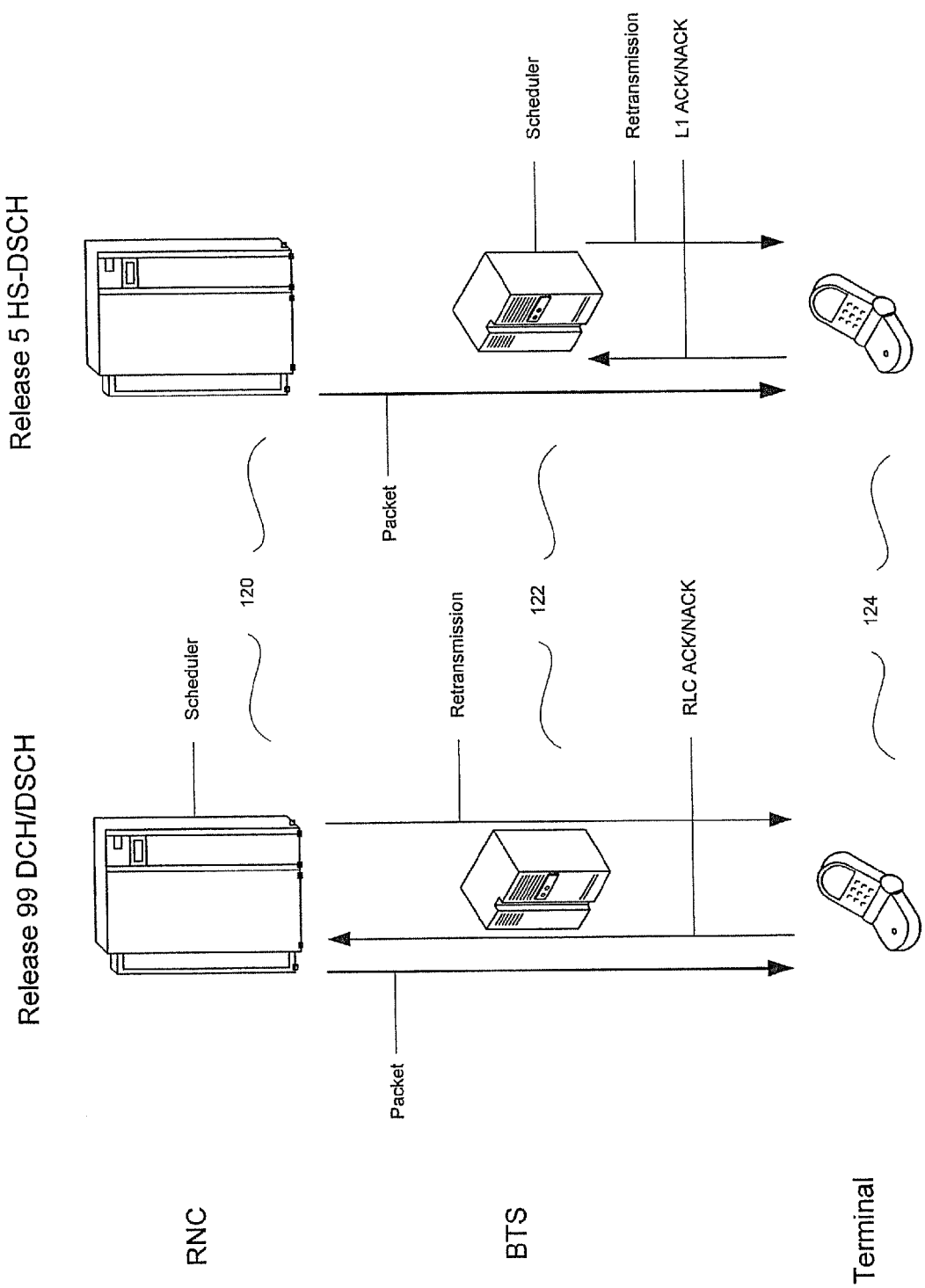
FIG. 1c illustrates an exemplary Layer 1 HARQ control situated in a base station to remove retransmission-related scheduling and storing from the radio network controller, in connection with an embodiment of the invention.

FIG. 1c illustrates an exemplary Layer 1 HARQ control situated in a base station to remove retransmission-related scheduling and storing from the radio network controller, in connection with an embodiment of the invention. Referring to FIG. 1c, there is shown a hybrid automatic repeat request (HARQ) operation, which is an operation designed to reduce the delay and increase the efficiency of retransmissions. Layer 1 HARQ control is situated in the Node B, or base station (BS), 122 thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Furthermore, received packets are combined at the physical (PHY) layer and retrieved only if successfully decoded. If decoding has failed, the new transmission is combined with the old transmission before channel decoding. The HSDPA approach allows previously transmitted frames (that failed to be decoded) to be combined with the retransmission. This combining strategy provides improved decoding efficiencies and diversity gains while minimizing the need for additional repeat requests.

While the spreading factor may be fixed, the coding rate may vary between ¼ and ¾, and the HSDPA specification supports the use of up to 10 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms interval frame length (also known as time transmit interval), compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may support 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
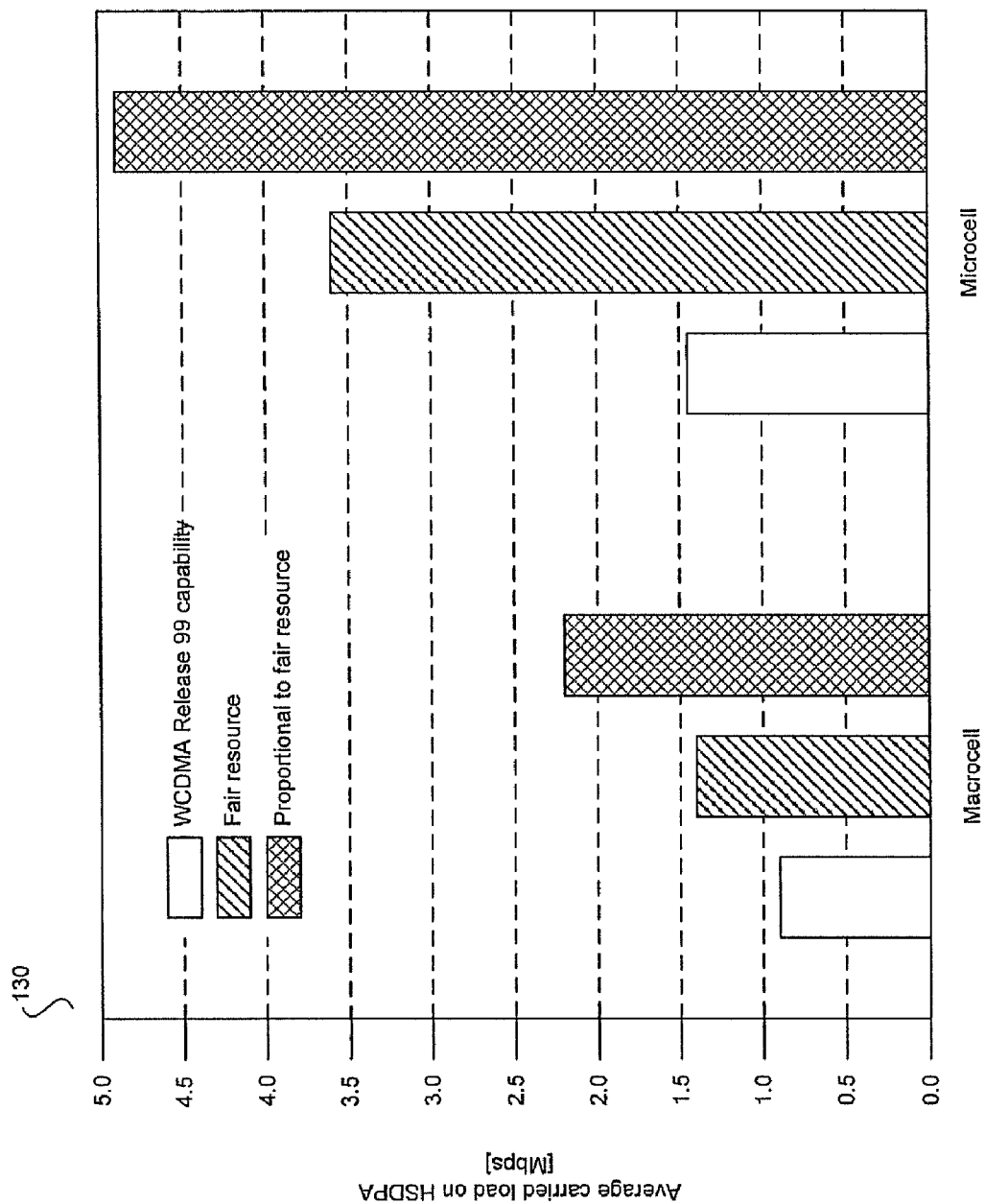
FIG. 1d is a chart illustrating exemplary average carried loads for HSDPA-based macrocell and microcell systems, in connection with an embodiment of the invention.

FIG. 1d is a chart illustrating exemplary average carried loads for HSDPA-based macrocell and microcell systems, in connection with an embodiment of the invention. Referring to chart 130 in FIG. 1d, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bits/Hz/cell.

Figure 2:
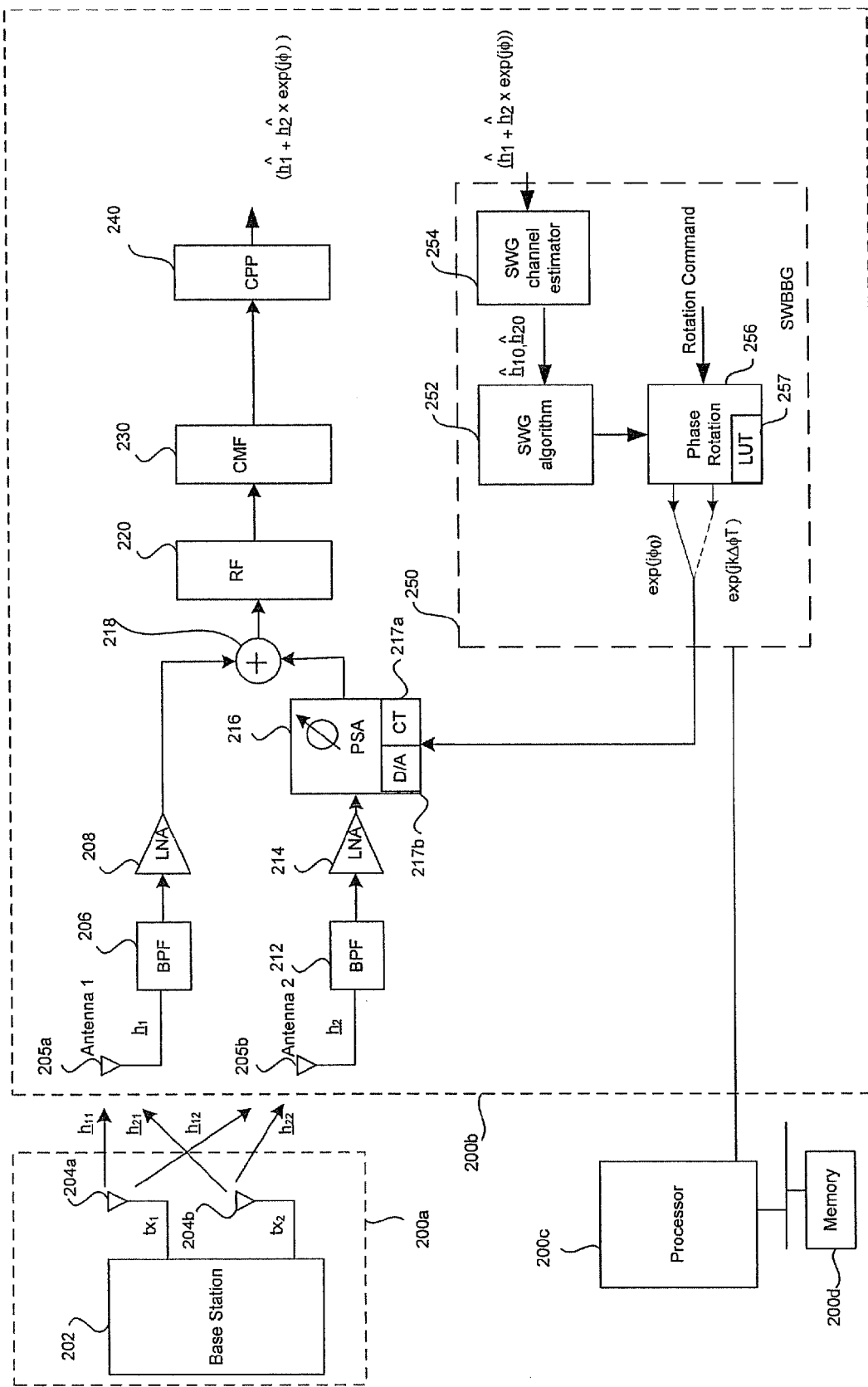
FIG. 2 is a block diagram of exemplary mobile receiver front-end, in accordance with an embodiment of the invention.

FIG. 2 is a block diagram of exemplary mobile receiver front-end, in accordance with an embodiment of the invention. Referring to FIG. 2, there is shown a transmitter section 200a, a receiver section 200b, a processor 200c, and a memory block 200d. The transmitter section 200a may comprise a base station 202 and transmit antennas 204a and 204b. The receiver section 200b may comprise receiver antennas 205a and 205b, RF bandpass filters (BPF) 206 and 212, low-noise amplifiers (LNA) 208 and 214, a phase shift adjuster (PSA) 216, a RF combiner 218, and a RF block 220. The receiver section 200b further comprises a chip matched filter (CMF) block 230, a cluster path processor (CPP) block 240, and a single weight baseband generator (SWBBG) block 250. The SWBBG block 250 may comprise a single weight channel estimator block 254, a single weight algorithm block 252, and a phase rotation block 256.

The base station 202 in the transmitter section 200a may transmit data $t_{x1}$ and $t_{x2}$ via the transmit antennas 204a and 204b, respectively. The transmitted data from the transmit antenna 204a may have propagation paths to the receiver antennas 205a and 205b that may have an aggregate time varying impulse response of $\underline{h}_{11}$ and $\underline{h}_{12}$, respectively. Similarly, the transmitted data from the transmit antenna 204b may have propagation paths to the receive antennas 205a and 205b that may have an aggregate time varying impulse response of $\underline{h}_{21}$ and $\underline{h}_{22}$, respectively. The time varying impulse responses that correspond to the propagation paths of the signals received by each of the receive antennas 205a and 205b may be represented by the channel responses $\underline{h}_1$ and $\underline{h}_2$, respectively. These channel responses may be modeled as the algebraic sum of the time varying impulse response $\underline{h}_{11}$ and $\underline{h}_{21}$ for the receive antenna 205a and $\underline{h}_{12}$ and $\underline{h}_{22}$ for the receive antenna 205b.

The receiver section 200b may comprise suitable logic, circuitry, and/or code that may be adapted to receive RF signals, process the RF signals by filtering, amplifying and/or adjusting phase and/or amplitude of the RF signals, and converting the processed RF signals to digital baseband signals. Furthermore, the receiver section 200b may be adapted to generate a single weight control signal based on processed digital baseband signals. Specifically, the BPFs 206 and 212 may comprise suitable logic and/or circuitry that may be adapted to receive a RF input, limit the frequencies of the signal to a determined band of frequencies, and output that band of frequencies. The LNAs 208 and 214 may comprise suitable logic and/or circuitry that may be adapted to receive an input signal, and amplify the input signal while introducing very little additional noise.

The PSA 216 may comprise suitable logic and/or circuitry that may be adapted to receive a control signal that may stimulate a change in the phase of an RF input signal. The phase change may be in exemplary increments of $k\Delta\phi$, where k may be an integer variable and $\Delta\phi$ may be a minimal phase change allowed. The minimal phase change $\Delta\phi$ may be design and/or implementation dependent. An embodiment of the invention may allow the variable k to range from 0 to N−1, where $N*(\Delta\phi)$ may be $2\pi$.

The RF combiner 218 may comprise suitable logic and/or circuitry that may be adapted to have as inputs a plurality of analog RF signals and output a combined analog RF signal that may be a sum of the plurality of analog RF signals. The RF block 220 may comprise suitable logic, circuitry, and/or code that may be adapted to receive an analog RF signal, and amplify, filter and/or otherwise convert the analog RF signal to a digital baseband signal for further processing. The CMF block 230 may comprise suitable logic, circuitry and/or code that may be adapted to digitally filter the digital baseband signal for a WCDMA baseband bandwidth. The CMF block 230 may comprise a plurality of digital filters for an in-phase (I) component and a quadrature (Q) component of the digital baseband signal. The digital filters may have a combined impulse response that may be square root raised cosine (SRRC), which may be required by the WCDMA specifications.

The CPP block 240 may comprise suitable logic, circuitry, and/or code that may be adapted to track time-wise clusters of multipath signals and to estimate the complex phase and/or amplitude of the multipath signals in the signal clusters. The signal cluster may comprise an aggregate of received signals with maximum time difference that may be no more than $16/(3.84 \times 10^6)$ seconds. U.S. application Ser. No. 11/173,854 provides a detailed description of signal clusters and is hereby incorporated herein by reference in its entirety. The CPP block 240 may be adapted to determine channel estimates $\underline{h}_1$ and $\underline{h}_2$ of the time varying impulse responses of the channels, for example, the multipath vectors $\underline{h}_1$ and $\underline{h}_2$. The CPP 240 may output the estimates as:

$$\underline{h}_1 + (\underline{h}_2 * e^{j\phi}).$$

The complex notation $e^{j\phi}$ may describe a pair of functions $\cos(\phi)$ and $\sin(\phi)$ where j may be the square root of $-1$. Therefore, $e^{j\phi}$ may describe a change of RF phase of $\phi$ that may be associated with the channel response $\underline{h}_2$. The single weight channel estimator block 254 may comprise suitable logic, circuitry, and/or code that may be adapted to receive the channel estimates from the CPP 240 during a RF phase learning stage. The RF phase learning stage may take place during a defined period for collecting signals that is used to generate a new phase $\phi_0$ for the PSA 216. The RF phase learning stage may be indicated by a control signal from the processor 200c, for example. The channel estimates may be processed, and at the end of the RF phase learning stage, the single weight channel estimator block 254 may output the channel estimates $\underline{h}_1$ and $\underline{h}_2$. The channel estimates $\underline{h}_1$ and $\underline{h}_2$ may be calculated using the following equations:

$$\underline{h}_{1,i} = (N)^{-1/2} \Sigma_{k=0,N-1} \text{CPPOutput}(k)_i$$

$$\underline{h}_{1,i} = (N)^{-1/2} \Sigma_{k=0,N-1} \text{CPPOutput}(k)_i \exp(jk\Delta\phi)_i$$

The CPPOutput(k) may be an output from the CPP 240 during the RF phase learning stage, and may be expressed as:

$$\text{CPPOutput}(k)_i = \underline{h}_{1,i} + (\underline{h}_2 * \exp(jk\Delta\phi)_i)$$

The variable k may be similar to the variable k used with respect to the description of the PSA 216. The variable i may indicate a multipath received by a receive antenna.

The single weight algorithm block 252 may comprise suitable logic, circuitry, and/or code that may be adapted to receive the phase shift channel estimates $\underline{h}_1$ and $\underline{h}_2$ to generate a phase $\phi_r$. The phase $\phi_r$ may be the phase of z, where z may be defined as:

$$z = \Sigma_{i=0,L-1} (\underline{h}_{2,i}^*)(\underline{h}_{1,i}),$$

$$\phi_r = \text{Phase}\{z\}$$

where $\underline{h}_{2,i}^*$ may be a complex conjugate of $\underline{h}_{2,i}$. The phase $\phi_r$ may represent a phase correction and may be communicated to the phase rotation block 256.

The phase rotation block 256 may comprise suitable logic, circuitry, and/or code that may be adapted to receive an asserted rotation command from a processor, for example, the processor 200c, during the RF phase learning stage, and other stages as may be necessary. The phase rotation block 256 may communicate via a control signal to the PSA 216 during the RF phase learning stage a plurality of phases from 0 to $2\pi$ radians. Therefore, the PSA 216 may adjust the phase of the received signal from the receive antenna 205b (FIG. 2) by the plurality of phases from 0 to $2\pi$. The plurality of phase changes may be indicated by $\exp(jk\Delta\phi)$ where k may range from 0 to N−1, such that $N\Delta\phi$ is equal to $2\pi$. The duration of the RF phase learning stage may be determined by a period T, where T may be the duration during which each value k may be asserted. This may be further illustrated in FIG. 4.

Additionally, the single weight channel estimator block 254 may use the output $\phi_r$ of the single weight algorithm block 252 to calculate the new phase $\phi_0$. In an embodiment of the invention, the phase rotation block 256 may determine $k_0$, where $k_0$ may be the value of k that may produce the desired phase $\phi_0$ that may be closest to the phase $\phi_r$ communicated by the single weight algorithm block 252. The variable $k_0$ may be determined by using the following equation:

$$k_0 = \text{Minimum}(|\phi_r - \phi(k)|)_{k=0,N-1}$$

After determining the variable $k_0$, the phase $\phi_0$ may be determined as:

$$\phi_0 = k_0 \Delta\phi.$$

The result of this process may be that the phase $\phi_0$ may be generated using the control signal $k_0$, where $k_0$ may be a value from the set $\{k: k=0, \ldots, N-1\}$. The SWBBG 250 may, therefore, be commanded either to generate the plurality of phases from 0 to $2\pi$ using the set of function signal $\exp(jk\Delta\phi)$, or the desired phase through the pair of values: $\exp(jk0\Delta\phi)$. For example, the values $\{\exp(jk\Delta\phi), k=0, \ldots, N-1\}$ may be stored in a lookup-table such that the value of k may be the address associated with the function pair $\{\cos(k\Delta\phi), \sin(k\Delta\phi)\}$ that are stored. The PSA 216 may, for example, use the conversion table 217a to convert the pair of numeric values that may be received into a numeric phase. The PSA 216 may also use the D/A converter 217b to convert the numeric phase into an analog value.

Although the control signal from the SWBBG 250 to the PSA 216 may have been described as being looked up in a look-up table 257, the invention need not be so limited. For example, the lookup table 257 and a conversion table 217a may be in different physical locations, or they may be part of the same memory block, for example, the memory block 200d.

The processor 200c may comprise suitable logic, circuitry, and/or code that may be adapted to monitor and/or control various functionalities of a mobile terminal. For example, the processor 200c may be adapted to monitor the rate of change in the measured channel response $\underline{h}_1 + (\underline{h}_2 * e^{j\phi})$ generated by the CPP 240 and generate an estimate of the moving speed of the mobile terminal. Based on the estimate of the mobile terminal moving speed, the processor 200c may determine how often the SWBBG 250 may perform a new phase $\phi_0$ for the PSA 216. The processor 200c may communicate a control command to the SWBBG 250. The control command may indicate to the SWBBG 250 whether to enter the RF phase learning stage to determine a new phase $\phi 0$ that may be communicated to the PSA 216.

Although the processor 200c may have been described as communicating a command to the SWBBG 250 to enter the RF phase learning stage, the invention need not be so limited. For example, a hardware circuit may be used to monitor data reception in order to determine when and/or how often the RF phase learning stage may take place.

The memory block 200d may be used to store code and/or data, and may be a writeable medium, for example, RAM. Portions of the memory block 200d may comprise look-up tables and/or conversion tables.

Figure 3:
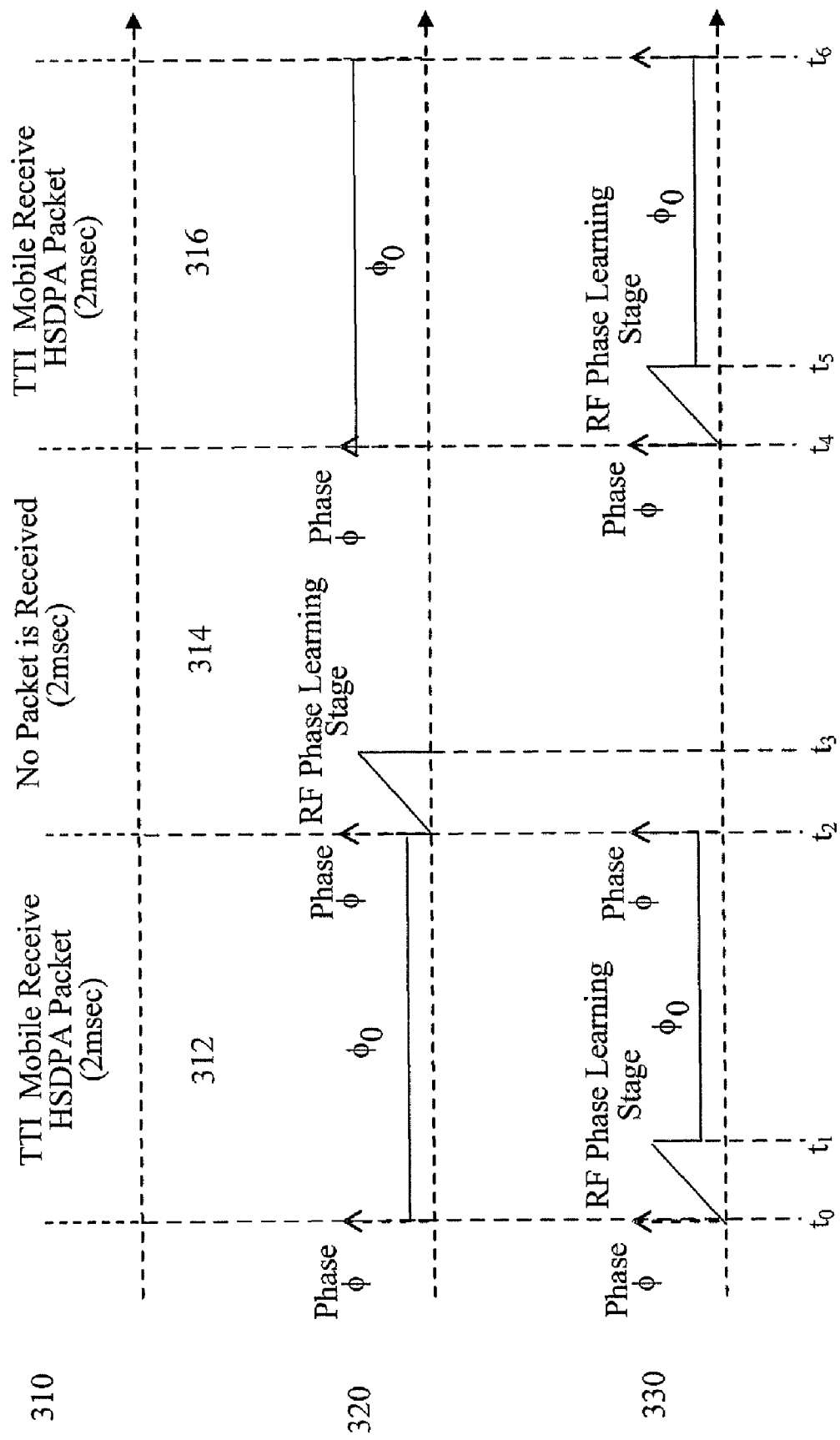
FIG. 3 is diagram of exemplary HSDPA transmit time intervals, in accordance with an embodiment of the invention.

FIG. 3 is a diagram of exemplary HSDPA transmit time intervals, in accordance with an embodiment of the invention. Referring to FIG. 3, there is shown a signal receive diagram 310, a first exemplary RF phase learning stage diagram 320, and a second exemplary RF phase learning stage diagram 330. The signal receive diagram 310 may show three transmit time intervals (TTIs) 312, 314 and 316 that may be utilized by HSDPA transmitters, for example, the base station 202 (FIG. 2), to transmit data packets. The TTIs 312, 314, and 316 may start at time instances $t_0$, $t_2$, and $t_4$, respectively, and may end at times $t_2$, $t_4$, and $t_6$, respectively. Each TTI may be 2 milliseconds (mS) in duration. A mobile terminal may be shown as receiving packet data during the TTIs 312 and 316, while not receiving any packet data during the TTI 314. However, common channels, in particular, a phase reference channel known as CPICH is always transmitted if the mobile terminal is in a HSDPA network.

The mobile terminal may determine a phase $\phi_0$ via the RF phase learning stage at the beginning of any TTI. However, if the RF phase learning stage occurs in a TTI when packet data is being received, a portion of the packet data may be in unfavorable receiving condition. Therefore, if possible, it may be useful to generate the phase $\phi_0$ during the TTIs when no packet data is being received. The first exemplary RF phase learning stage diagram 320 may illustrate a case where the RF phase learning stage occurs during a TTI, for example, the TTI 314, when no packet data being received. The RF phase learning stage may start at the beginning of the TTI 314 at time instant $t_2$, and end at time instant $t_3$. The phase $\phi_0$ generated during the TTI 314 may be used for future TTIs, for example, the TTI 316. How often a new phase $\phi_0$ is generated may be design and/or implementation dependent.

Although generating the phase ϕ0 during TTIs when no packet data is being received may be useful when the mobile terminal is moving slowly or not at all, the phase ϕ0 may have to be generated more frequently when the mobile terminal is moving faster. The determination of how often and when to generate the phase ϕ0 may be design and/or implementation dependent. An embodiment of the invention may generate the phase ϕ0 so that it may be used during the TTI when packet data are being received, for example, the TTIs 312 and 316. The second exemplary RF phase learning stage diagram 320 may illustrate this. The RF phase learning stages may start at time instances t0 and t4, and end at time instances t1 and t5. The phase ϕ0 may be used during the TTI when it was generated. For example, the phase ϕ0 generated in TTI 312 may be used during the TTI 312 to receive packet data, and the phase ϕ0 generated in TTI 316 may be used during the TTI 316. Although the RF phase learning stage may induce an unfavorable condition for a short period for signal reception, the benefit from using the RF phase learning stage may outweigh the non-optimal two antenna signal-combining that may occur otherwise.

Figure 4:
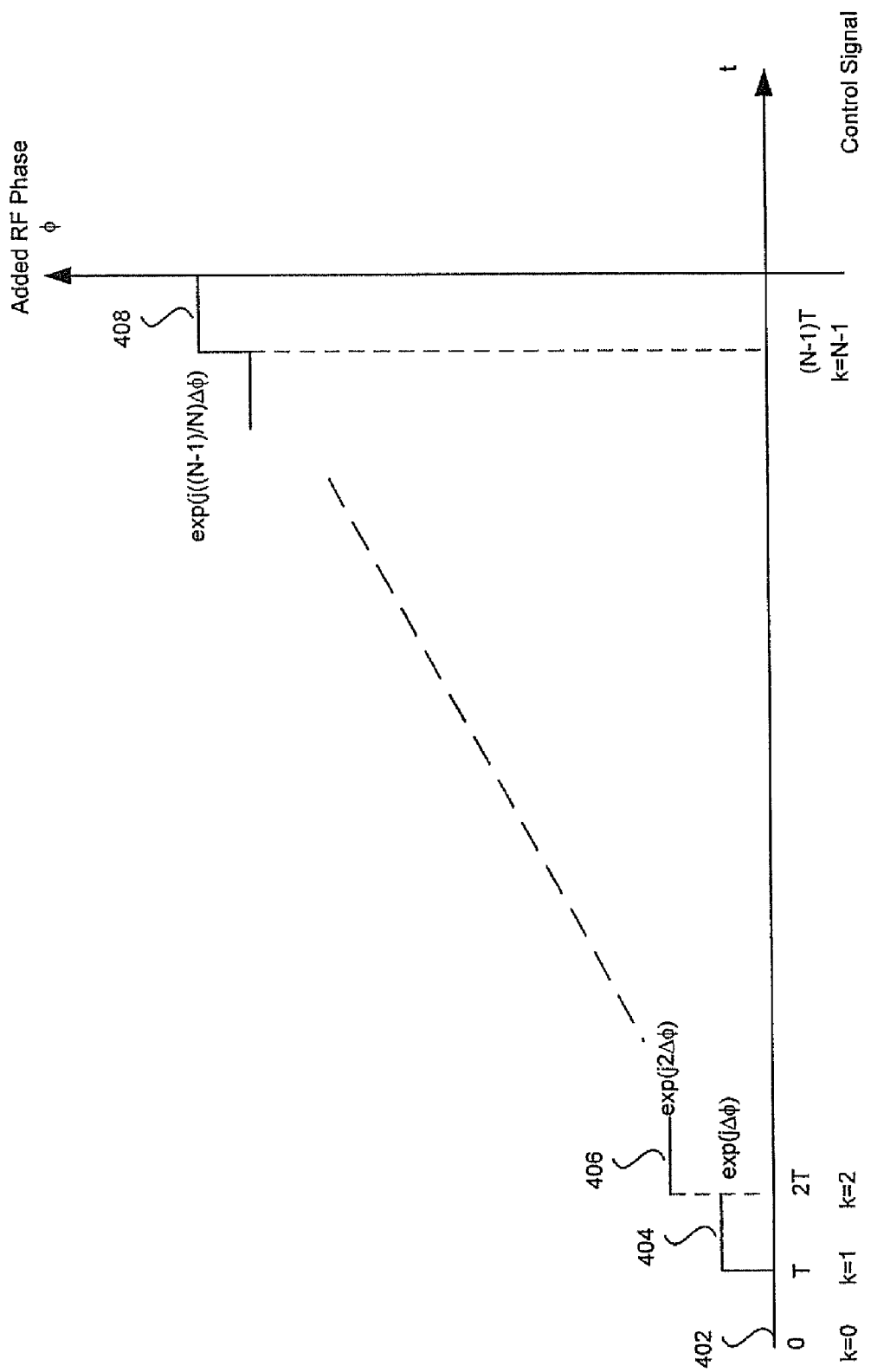
FIG. 4 is diagram of exemplary phase control signal, in accordance with an embodiment of the invention.

FIG. 4 is a diagram of exemplary phase control signal, in accordance with an embodiment of the invention. Referring to FIG. 4, there is shown a diagram that illustrates the control signal that may be generated by the phase rotation block 256 during the RF phase learning stage. The control signal may comprise phase by which the PSA 216 (FIG. 2) may change the phase of the input signal received by the receive antenna 205b. There may be N distinct discrete phases 402, 404, 406, ..., 408, communicated by the control signal, and each phase may last for a period T. Each discrete phase may be communicated by the signal $\exp(jk\Delta\phi)$, where k may range from 0 to N−1. Therefore, a plurality of phases 402, 404, 406, ..., 408, ranging from 0 to $\exp(j((N-1)/N)\Delta\phi)$ may be communicated to the PSA 216. The time N*T may be determined to be the period of the RF phase learning stage. N and/or T may be design and/or implementation dependent.

Although the sequence described here is based on HSDPA communication network, it will be obvious that the invention can be utilized in many other type of communication networks Aspects of the system may comprise a plurality of receive antennas 205a and 205b (FIG. 2) that receives HSDPA signals. A phase shift adjuster 216 (FIG. 2) may individually adjust a phase of a portion of the received HSDPA signals via a single weight. A RF combiner 218 (FIG. 2) may combine the phase adjusted portion of the received HSDPA signals with at least one of the received signals to generate combined HSDPA signals. A single weight baseband generator 250 (FIG. 2) may generate at least one control signal that comprises the single weight that controls the adjusting of the phase of the portion of the received HSDPA signals. The single weight baseband generator 250 may determine a discrete phase to phase adjust a portion of the received HSDPA signals. A processor 200c (FIG. 2) may identify a time to determine a discrete phase to adjust a portion of the received HSDPA signals and generate appropriate controls signals.

The single weight baseband generator 250 may communicate a plurality of the discrete phases 402, 404, 406, ..., 408 (FIG. 4) to adjust the phase of the portion of the received HSDPA signals, where the plurality of the discrete phases 402, 404, 406, ..., 408 may range from zero radians to substantially 2π radians. A single weight channel estimator 254 (FIG. 2) may receive a channel estimate from the CPP block 240 and generate channel estimates for the receiver antennas 205a and 205b. A single weight algorithm block 252 (FIG. 2) may generate a desired phase based on the channel estimate for antennas 205a and 205b. A phase rotation block 256 (FIG. 2) may generate the single weight that constitutes the desired RF phase.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile wireless communication device having a first antenna and a second antenna, comprising:
   a first bandpass filter operatively coupled to a first low noise amplifier, wherein the first bandpass filter is operatively disposed between the first low noise amplifier and the first antenna;
   a second bandpass filter operatively coupled to a second low noise amplifier, wherein the second bandpass filter is operatively disposed between the second low noise amplifier and the second antenna;
   a phase shift adjuster operatively coupled to an RF combiner, wherein the phase shift adjuster is operatively disposed between the RF combiner and the second low noise amplifier, wherein the RF combiner combines a first RF analog signal output by the first low noise amplifier and a second RF analog signal output by the phase shift adjuster;
   a cluster path processor operatively coupled to the RF combiner, wherein the cluster path processor is configured to track time-wise clusters of multipath signals and to estimate a complex phase and an amplitude of the multipath signals in the signal clusters; and
   a baseband weight generator that receives information from the cluster path processor and generates a phase control signal to the phase shift adjuster.

2. The mobile wireless communication device according to claim 1, wherein the mobile wireless communication device supports HSDPA.

3. The mobile wireless communication device according to claim 2, wherein the HSDPA co-exists on a same carrier as WCDMA and UMTS services.

4. The mobile wireless communication device according to claim 3, wherein mobile wireless communication device supports adaptive modulation and coding, multicode operation and retransmission strategies.

5. The mobile wireless communication device according to claim 3, wherein the chip matched filter is configured to digitally filter the baseband filter for a WCDMA baseband bandwidth.

6. The mobile wireless communication device according to claim 2, comprising a chip matched filter operatively coupled to the cluster path processor, wherein the chip matched filter comprises a plurality of digital filters for an in-phase component and a quadrature component of a baseband signal.

7. The mobile wireless communication device according to claim 2, wherein the phase shift adjuster is configured to adjust a phase of a signal received from the second low noise amplifier in discrete increments.

8. The mobile wireless communication device according to claim 7, wherein the discrete increments are integer multiples of a minimum phase change.

9. The mobile wireless communication device according to claim 2, wherein the phase shift adjuster comprises a digital-to-analog converter and a conversion table.

10. The mobile wireless communication device according to claim 9, wherein the phase shift adjuster uses the conversion table to convert a pair of numeric values into a numeric phase.

11. The mobile wireless communication device according to claim 2, wherein the baseband weight generator comprises a phase rotator and a lookup table, wherein the lookup table provides the phase control signal to the phase shift adjuster.

12. The mobile wireless communication device according to claim 2, comprising a second processor operatively coupled to the baseband weight generator, wherein the second processor monitors or controls particular functionalities of the mobile wireless communication device.

13. The mobile wireless communication device according to claim 12, wherein the cluster path processor generates a measured channel response, and wherein the second processor monitors a rate of change in the measured channel response to estimate a moving speed of the mobile wireless communication device.

14. The mobile wireless communication device according to claim 13, wherein the second processor determines how often the baseband weight generator provides a new phase control signal to the phase shift adjuster based on the estimated moving speed of the mobile wireless communication device.

15. The mobile wireless communication device according to claim 2, comprising RF circuitry operatively coupled to the RF combiner, wherein the RF circuitry is operatively disposed between the RF combiner and the cluster path processor.

16. The mobile wireless communication device according to claim 15, wherein the RF circuitry is configured to amplify, to filter and to convert a combined RF signal received from the RF combiner into a combined baseband signal.

17. The mobile wireless communication device according to claim 2, wherein the first bandpass filter, the second bandpass filter, the first low noise amplifier, the second bandpass filter, the phase shift adjuster and the RF combiner are part of a MIMO receiver.

18. The mobile wireless communication device according to claim 17, wherein the MIMO receiver is part of a mobile MIMO phone.

19. The mobile wireless communication device according to claim 2, wherein the mobile wireless communication device is a mobile MIMO phone.

20. The mobile wireless communication device according to claim 2, wherein the mobile wireless communication device is a mobile phone.

21. The mobile wireless communication device according to claim 20, wherein the mobile phone supports one or more of the following: WCDMA, GPRS, EDGE and UMTS.

22. The mobile wireless communication device according to claim 20, wherein the mobile phone supports Layer 1 HARQ control.

23. The mobile wireless communication device according to claim 20, wherein the mobile phone supports using up to ten multicodes.

* * * * *